United States Patent [19]

Balko et al.

[11] 4,230,673

[45] Oct. 28, 1980

[54] APPARATUS FOR REMOVING NITROGEN TRICHLORIDE FROM CHLORINE GAS

[75] Inventors: Edward N. Balko, Trenton; Shyam D. Argade, Woodhaven, both of Mich.

[73] Assignee: BASF Wyandotte Corporation, Wyandotte, Mich.

[21] Appl. No.: 9,635

[22] Filed: Feb. 5, 1979

Related U.S. Application Data

[62] Division of Ser. No. 803,133, Jun. 3, 1977, Pat. No. 4,138,296.

[51] Int. Cl.² .......................... B01J 1/00; B01J 7/02
[52] U.S. Cl. .................................. 422/225; 55/71; 204/128; 422/187; 422/231; 422/234
[58] Field of Search ................ 204/128; 55/71; 422/187, 198, 129, 231, 256, 260, 234, 225

[56] References Cited

U.S. PATENT DOCUMENTS

| | | | |
|---|---|---|---|
| 2,705,219 | 3/1955 | Heiskell et al. | 204/128 |
| 2,841,243 | 2/1958 | Hooker et al. | 423/240 X |
| 3,568,409 | 3/1971 | Ferguson et al. | 55/71 |
| 4,157,374 | 6/1979 | Carpenter et al. | 423/240 |

*Primary Examiner*—Michael S. Marcus
*Attorney, Agent, or Firm*—Bernhard R. Swick

[57] ABSTRACT

In a process for making chlorine electrolytically in which a build-up of nitrogen trichloride occurs in the bottoms of cooling apparatus, a method and apparatus is provided wherein the nitrogen trichloride is dissolved in an organic solvent such as carbon tetrachloride, the chlorine removed, and the solution treated to destroy the otherwise hazardous nitrogen trichloride. The solvent is then separated and recycled to avoid environmentally undesirable waste products.

9 Claims, 2 Drawing Figures

APPARATUS FOR REMOVING NITROGEN TRICHLORIDE FROM CHLORINE GAS

This is a division of application Ser. No. 803,133, filed June 3, 1977, now U.S. Pat. No. 4,318,296.

BACKGROUND OF THE INVENTION

1. Field of the Invention

The present invention relates to a method and apparatus for the removal of nitrogen trichloride from chlorine, and more particularly to such a method and apparatus in which waste products detrimental to the environment are avoided.

2. Description of the Prior Art

Chlorine, when produced electrolytically, frequently contains several parts per million of hazardous nitrogen trichloride. This nitrogen trichloride is caused by reaction of ammonia or ammonium ion which is invariably present in the electrolysis brine. Additional ammonia may enter the system from cooling water containing same where direct contact chlorine cooling is employed.

Although the initial concentrations of nitrogen trichloride are rather low, higher concentrations tend to build up due to the great difference in vapor pressures between chlorine (Boiling Point of $-34°$ C.) and nitrogen trichloride (Boiling Point of $71°$ C.). Thus even very low concentrations can be hazardous. For example, more than once, one ton chlorine cylinders have been known to explode when empty, and this is believed to have been caused by nitrogen trichloride remaining after chlorine removal.

Thus the hazard is well known, and a number of systems have been proposed to overcome the problem. For example, U.S. Pat. No. 2,705,219 proposes the destruction of nitrogen chloride in the chlorine stream by subjecting the stream to actinic light. Alternatively, U.S. Pat. No. 3,568,409 suggests the destruction of nitrogen trichloride in a chlorine stream (preferably as it leaves the cell room) by contacting the stream with 20% to 30% hydrochloric acid.

Although these patents do provide methods for destroying nitrogen trichloride, they require additional equipment and processing in the work up of the stream of chlorine, and are not in widespread use. In the usual procedures for purifying the chlorine stream coming from the cell room, the stream will reach a cooler or the like where condensate collects. This condensate is mostly liquid chlorine, but this is where the nitrogen trichloride tends to accumulate. One of the common present practices calls for contacting these liquid chlorine bottoms with carbon tetrachloride or chloroform to retain a dilute solution of nitrogen trichloride as the chlorine is allowed to evaporate away. The solvent is then discarded either directly or after addition of caustic.

Due to the fact that chlorinated organic compounds have become recognized as carcinogenic, it is no longer feasible to simply sewer the solvent. However, it is still desirable to use organic solvents to extract the nitrogen trichloride, and the present invention allows for such use.

SUMMARY OF THE INVENTION

In accordance with the invention, a safe, inexpensive process for nitrogen trichloride removal from a chlorine stream is provided, in which inert organic solvents are utilized. The process also provides for recycle of organic solvent, which results in a cost saving in solvent and eliminates the discharge of carcinogenic material to the environment.

In its process form, the invention provides a method of electrolytically producing gaseous chlorine from a brine and the subsequent recovery of chlorine, in which method nitrogen trichloride is produced as a contaminant in said chlorine, wherein the improvement comprises providing a condensate of some of said chlorine and higher boiling contaminants including nitrogen trichloride, mixing said condensate with an inert organic solvent for said nitrogen trichloride to form a solution thereof, removing chlorine from the solution, adding a reducing agent to said solution in an amount sufficient to convert the nitrogen trichloride to ammonium chloride, separating the organic solvent from the reaction mixture, and recycling the solvent to treat further condensate.

Preferably, the build-up of nitrogen trichloride is determined analytically, and the results of analysis are used to determine when to treat the condensate, and how much reducing agent to use. Preferably, the condensate is also removed from the main chlorine purification system, and treated in accordance with the invention in a separate facility. The preferred inert organic solvent is carbon tetrachloride and next preferred is chloroform. After the solvent has been added, the chlorine may be safely distilled from the condensate, and it is preferred to remove substantially all of the chlorine since it impedes efficient destruction of nitrogen trichloride.

The destruction of nitrogen trichloride may be carried out in an anhydrous system or in an aqueous system. When using an anhydrous system, the preferred reducing agent is anhydrous hydrochloric acid which reacts with nitrogen trichloride to produce ammonium chloride and chlorine. The excess hydrogen chloride and chlorine are removed as gases, and the ammonium chloride filtered from the solvent. The solvent is then ready for recycle.

When an aqueous solution of reducing agent is used, the reaction is carried out with sufficient agitation to react with the nitrogen trichloride dissolved in the organic phase. This nitrogen trichloride reacts to produce ammonium chloride, possible side products such as hydrochloric acid and the oxidized form of the reducing agent, all of which are soluble in water. These components are thus separated by simple liquid phase separation, and the solvent recycled.

In its apparatus form, the invention provides an apparatus for the processing of electrolytically produced chlorine from a brine wherein nitrogen trichloride is produced as a contaminant in said chlorine and accumulates in certain of the units containing condensate, and wherein the improvement consists of providing an auxiliary apparatus for removing and destroying nitrogen trichloride comprising an extraction device for receiving chlorine containing an accumulation of nitrogen trichloride, means for moving said contaminated chlorine and nitrogen trichloride to said extraction device, means for adding an inert organic solvent to said extraction device in an amount sufficient to provide a safely diluted solution of nitrogen trichloride therein, means for heating the extraction device to remove substantially all of the chlorine therefrom, reactor means, means for moving the contents of the extraction device to the reactor means, means for adding a reaction component capable of reacting with nitrogen trichloride and converting it to ammonium chloride, means for separating the solvent from the reaction mixture after the conversion of the nitrogen trichloride, and means for recycling the separated solvent to the extraction device.

DESCRIPTION OF THE DRAWINGS

In the accompanying drawings, in which like parts are identified by the same numerals throughout.

Figure 1:
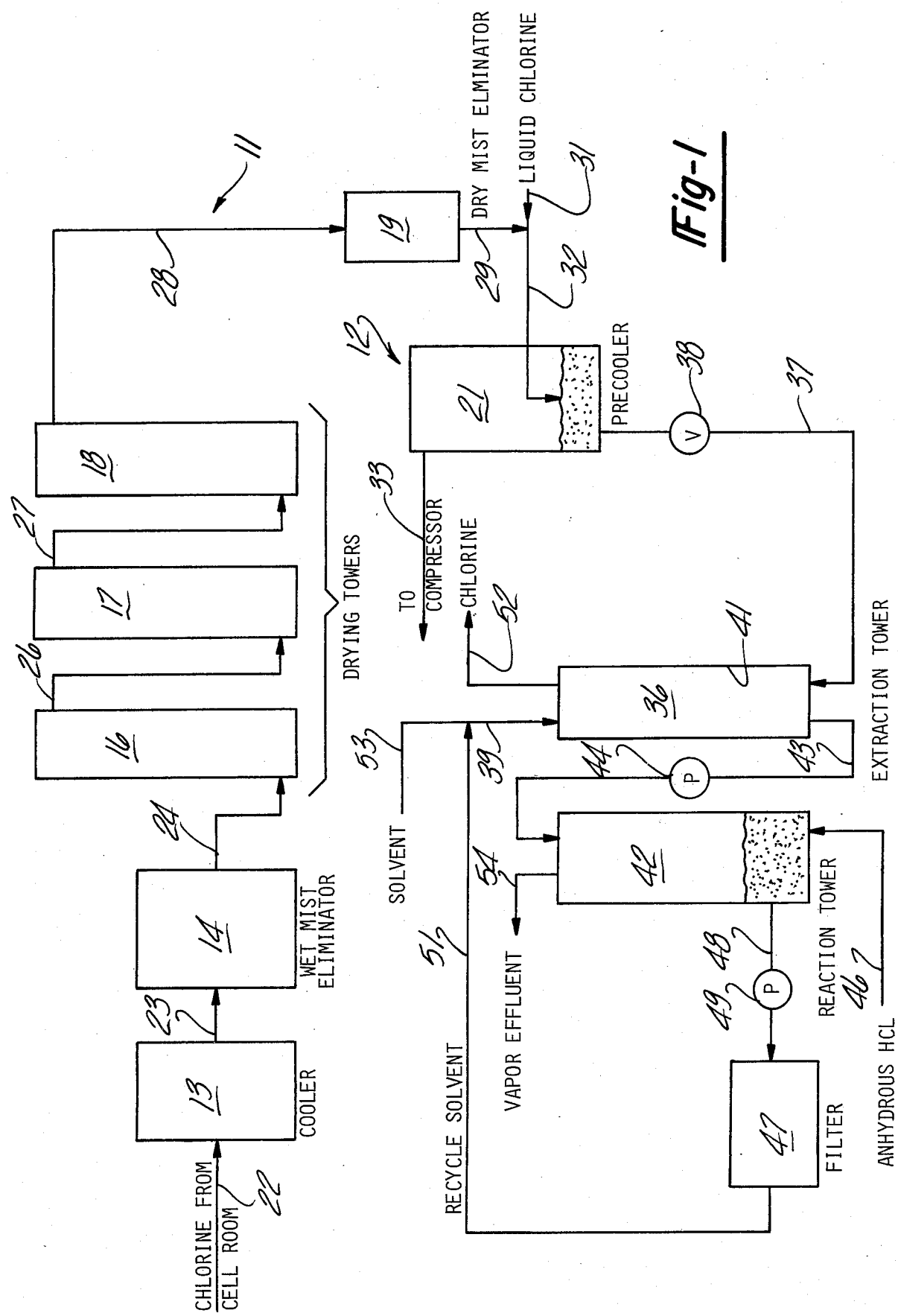
FIG. 1 is a flow diagram illustrating a typical process and apparatus for purifying a chlorine stream from electrolytic production thereof incorporating one form of the invention.

While only the preferred embodiments are shown in the drawings, it should be understood that various changes or modifications may be made therein without departing from the spirit and scope of the appended claims.

DESCRIPTION OF THE PREFERRED EMBODIMENTS

Referring to the drawings in greater detail, there is shown in FIG. 1, a flow diagram illustrating a typical apparatus 11 for the processing of electrolytically produced chlorine from a brine, wherein nitrogen trichloride appears as a contaminant in said chlorine, and an auxiliary apparatus 12 for the removal and safe destruction of the nitrogen trichloride.

As here shown, apparatus 11 comprises a cooler 13, wet mist eliminator 14, a series of drying towers 16, 17 and 18, dry mist eliminator 19, and precooler 21 along with appropriate connecting lines. Chlorine from the cell room enters the system through line 22, with a typical temperature of the chlorine stream being 190° F. This chlorine stream may contain say about 600, to 12,000 parts per million (p.p.m.) by weight of water, from about 5 to 150 p.p.m. of nitrogen trichloride and from about 5 to 100 p.p.m. of brine (a mixture of inorganic salts and water). Although steps can be taken to keep the nitrogen trichloride at low levels in the chlorine stream from the cell room, it will be invariably present and minimal amounts present are in the range of say 5 to 10 parts per million by weight.

Typical sources of ammonia or ammonium ion include the brine itself, the water employed in solution mining of the salt, and ammonia in soda ash used for brine purification. Accordingly, even when precautions are taken to avoid contamination of the electrolysis brine with ammonia, ammonium ions or amines, and it is recommended that such precautions be taken, it is impossible to avoid a certain amount of such initial contamination.

The formation of the nitrogen trichloride may be represented by the overall reaction

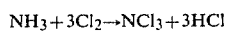

however it should be recognized that the replacement of hydrogen probably proceeds in a stepwise manner. In view of the high concentration of chlorine the reaction proceeds to substantial completion.

Referring again to FIG. 1, the chlorine stream from the cell room is first cooled in the cooler 13, which may be a direct contact cooler using a cold water spray or a heat exchanger. From the cooler 13, the stream proceeds through line 23 to the wet mist eliminator. This unit is sometimes omitted depending on the wetness of the stream in line 23. From the wet mist eliminator, the stream proceeds through line 24 to the series of drying towers 16, 17 and 18 which are connected in series by lines 26 and 27.

The drying towers typically operate using concentrated sulfuric acid in counter-current flow. This acid removes water and certain other impurities from the chlorine stream. It will also be appreciated that the sulfuric acid is also a source of ammonium ions, although it is recommended to use acid which has a very small amount of such ions as an impurity. In the case of direct contact cooling, the cooling water is also a source of ammonia, ammonium ion, or amine, and this cooling water can make a considerable contribution to the overall amount of nitrogen trichloride contaminant.

After being dried, the chlorine stream passes through line 28 through dry mist eliminator 19, and out through line 29. The dry mist eliminator is a unit that functions to remove sulfuric acid mist and any other tangible contaminants such as rust. In some cases, such as where the stream is purified in a purification tower, the dry mist eliminator may be omitted.

The chlorine stream in line 29 is then picked up with a stream of liquid chlorine (recycled from product) entering through line 31, and the mixture is fed through line 32 to the precooler 21. The amount of liquid chlorine and dry chlorine gas is adjusted so that a liquid and gaseous phase is kept in the precooler. In this way the relatively high boiling nitrogen trichloride collects in the liquid phase. Similarly, other impurities such as carbon tetrachloride, hexachloroethane, chloroform or other chlorinated organic materials formed in the electrolysis brine may collect here. The purified chlorine is removed as a gas through line 33, and sent to a compressor (not shown).

It will be appreciated that variations in the purification system will vary in different plants and that the above description is only one method. For example, the chlorine stream from line 28 could be passed through a centrifugal blower to a bottoms drum where condensate will collect. In such an arrangement the stream from the bottoms drum may then be purified in a purification tower, passing counter-current to liquid chlorine. The bottoms of the tower are recycled back to the bottoms drum and the condensate therein treated as is accomplished with the condensate of the precooler. Alternatively, the stream from either line 28 or 29 could be sent directly to a tower (either packed or unpacked) for purification. Such purification tower could also be equipped with a reboiler, if desired.

So far the description of the purification system is conventional, and the particular system is unimportant. However, in all of these systems, there is at least one container having a condensate in which nitrogen trichloride tends to accumulate, and it will be appreciated that even with low concentrations of nitrogen trichloride in the chlorine stream, the accumulation can become dangerous. In fact, only recently an explosion occurred in a reboiler, in which the concentration of nitrogen trichloride in the liquid chlorine was believed to be about 8.5% by weight. This represented about a one week accumulation, and the explosion occurred just a few hours before the condensate was to be disposed of. Accordingly, the condensate should be treated before such a high accumulation of nitrogen trichloride builds up, and it is recommended that the concentration not be allowed to exceed from 1 to 2% by weight.

It will also be appreciated that when the condensate is removed from the precooler or equivalent unit, boiling off of the chlorine will concentrate the solution. In accordance with practice prior to this invention, the condensate was first treated by adding carbon tetrachloride or chloroform to retain the nitrogen trichloride in dilute condition. Then the whole solution was sewered either with or without further treatment to destroy the nitrogen trichloride. However, in the usual case the waste solution was treated with caustic.

In accordance with the invention, a method and apparatus is provided that insures safe handling and disposal of the nitrogen trichloride in an efficient and inexpensive fashion. In addition, the invention provides for a disposal which meets rigid environmental standards.

Referring again to FIG. 1, auxiliary apparatus 12 comprises an extraction device 36, means for moving condensate from the precooler 21 to the extraction device 36 in the form of line 37 equipped with a valve 38 (for gravity feed) or a pump, means for adding an inert solvent to the extraction tower through line 39, means for heating the extraction device to remove much of the chlorine therefrom (ambient temperatures are sufficient to supply heat through walls 41 and vaporize the chlorine), reactor means 42, means for moving the contents of the extraction tower 36 to the reactor means 42 in the form of line 43 and a pump 44, means for adding a reaction component capable of reacting with nitrogen trichloride and converting it to ammonium chloride through line 46, means (filter 47 or possibly a centrifuge) for separating the solvent from the reaction mixture after the conversion to ammonium chloride, and means for recycling the separated solvent to the extraction device. The separation and recycling is provided by line 48 communicating between the reaction tower 42 and filter 47, with pump 49 located in line 48 to move the slurry from the reaction tower 42 to the filter 47; and the solvent passing through the filter through recycle line 51 to line 39 and back into the extraction tower.

In operation, a typical chlorine stream in line 22 from the cell room will have a temperature of about 190° F. After cooling, it will enter the drying towers at say 55° to 60° F. and leave the drying towers at say about 80° to 90° F. This stream is then joined with liquid chlorine (the boiling point of which is −34° C. or −29° F.).

The partial pressure of nitrogen trichloride at −10° C. is 60 torr and at −20° C. is about 20 torr. Thus it is seen that the nitrogen trichloride condenses into the liquid chlorine and accumulates in the precooler bottoms. The amount of nitrogen trichloride accumulation will depend somewhat on the efficiency of removal thereof at the final separation from the chlorine streams. For example, the concentration of nitrogen trichloride in the final chlorine product may range from about 1 to about 10 parts per million depending upon the efficiency of the final purification. This in turn will vary with the expected use of the chlorine, and certain direct in-plant use will allow for the higher concentrations while generally commercial sales should be at the lower end of the scale or less. Use of a good purification tower, of course, lowers the nitrogen trichloride in the final product.

Thus it is seen that the rate of accumulation of nitrogen trichloride will depend upon the amount generated in the system, and the efficiency of removal. In any event, nitrogen trichloride accumulates in the condensate in most systems and must be disposed of. Various methods of checking the nitrogen trichloride in the condensate have been used. In some plants, a program was developed to dispose of the condensate before build-up gets too high. This procedure has the disadvantage that a change in operations could make the scheduled disposal dangerous. For example, the plant explosion mentioned above was caused by a change in the concentration of ammonia in the cooling water. It is therefore recommended that the condensate be monitored by analysis to determine the safe optimum time for disposing of each batch of condensates. Such analytical data can then be used to minimize the excess of material used to destroy the nitrogen trichloride.

Referring again to FIG. 1 and the procedure of operation, valve 38 is opened to drain a batch of condensate from precooler 21 or equivalent. It is recommended that the condensate have less than about 2% nitrogen trichloride therein. The condensate flows by gravity to the extraction tower 36 wherein contact by simple liquid mixing or by a spray of organic solvent moving countercurrent to the vapor scrubs out the nitrogen trichloride from the chlorine as it vaporizes. The chlorine gas is then removed through line 52 to chlorine disposal. If desired, this chlorine could be recycled back to the purification system, but the amounts of chlorine evaporated here are so small it may be economically more feasible to dispose of it.

The organic solvent enters the extraction tower from recycle line 51, or in the case of start up from line 53, or in the case of make-up from both lines 51 and 53.

In general, any organic solvent which is inert or substantially inert to the chlorine may be used. Carbon tetrachloride is preferred since it is completely inert, and trichloromethane or chloroform is eminently satisfactory although some chlorination thereof to carbon tetrachloride may occur. Hexachloroethane, or any highly chlorinated lower aliphatic hydrocarbon may be used so long as it is a good solvent for the nitrogen trichloride. Thus chlorinated methanes, chlorinated ethanes and chlorinated propanes in which molecular proportion of chlorine to hydrogen exceeds 3:2 are all suitable.

The amount of solvent required to keep the nitrogen trichloride safe is not clearly known. However, the more concentrated the nitrogen trichloride, the more hazardous the solution. In general, it is believed that the concentration of nitrogen trichloride should not exceed 5% in solution, and we prefer to keep the concentration below about 2.0%. Accordingly, the chlorine removed in the extraction tower 36 is replaced completely by solvent to retain a safe dilution. In this operation, substantially all of the chlorine is also preferably removed, because chlorine operates to reverse the equilibrium of the reaction used to destroy nitrogen trichloride in the embodiment of FIG. 1. It also oxidizes the reducing agents suggested for the embodiment of FIG. 2.

After the extraction operation is complete, the solution is pumped to the reaction tower 42, by means of pump 44 located in line 43. Anhydrous hydrogen chloride is then bubbled through the solution to react with the nitrogen trichloride therein. The reaction proceeds quantitatively as shown below.

$$NCl_3 + 4HCl \text{ (gas)} \rightarrow NH_4Cl + 3Cl_2 \uparrow$$

The anhydrous hydrogen chloride may be added as a substantially pure gas or mixed with other dry gases. Preferably, dry nitrogen or dry air is mixed with the hydrogen chloride and added therewith to provide greater agitation and to strip chlorine from the solvent in order to minimize the back reaction.

The chlorine thus formed in the reaction is removed through line 54 and disposed of. As was the case of the chlorine in line 52, the amounts of chlorine are too small to be worth recovering. In addition, the chlorine removed in line 54 will contain excess hydrogen chloride together with any nitrogen or air that was added. However, in certain brine plants, such as mercury cell, this chlorine-hydrochloric acid mixture may be conveniently recycled to the plant.

The solvent from the reaction tower 42, is removed through line 48 and pumped through filter 47 by pump 49. The solvent passing through the filter is then returned to the extraction tower through recycle line 36. The amount of hydrogen chloride to be used in the reaction tower is preferably determined by the analyses of the nitrogen trichloride removed from the precooler. In this way, a small excess say about 20% excess is sufficient to prevent a build-up of nitrogen trichloride in the solvent recycle system. If desired, this solvent may also be checked by analysis.

It will be appreciated that certain process variations may be effected, if desired, without departing from the spirit of the invention. For example, solvent could be added to the precooler, in addition to, or instead of, to the extraction tower. However, it is preferred not to add solvent to the precooler, because it would introduce traces of the solvent into the chlorine product.

Figure 2:
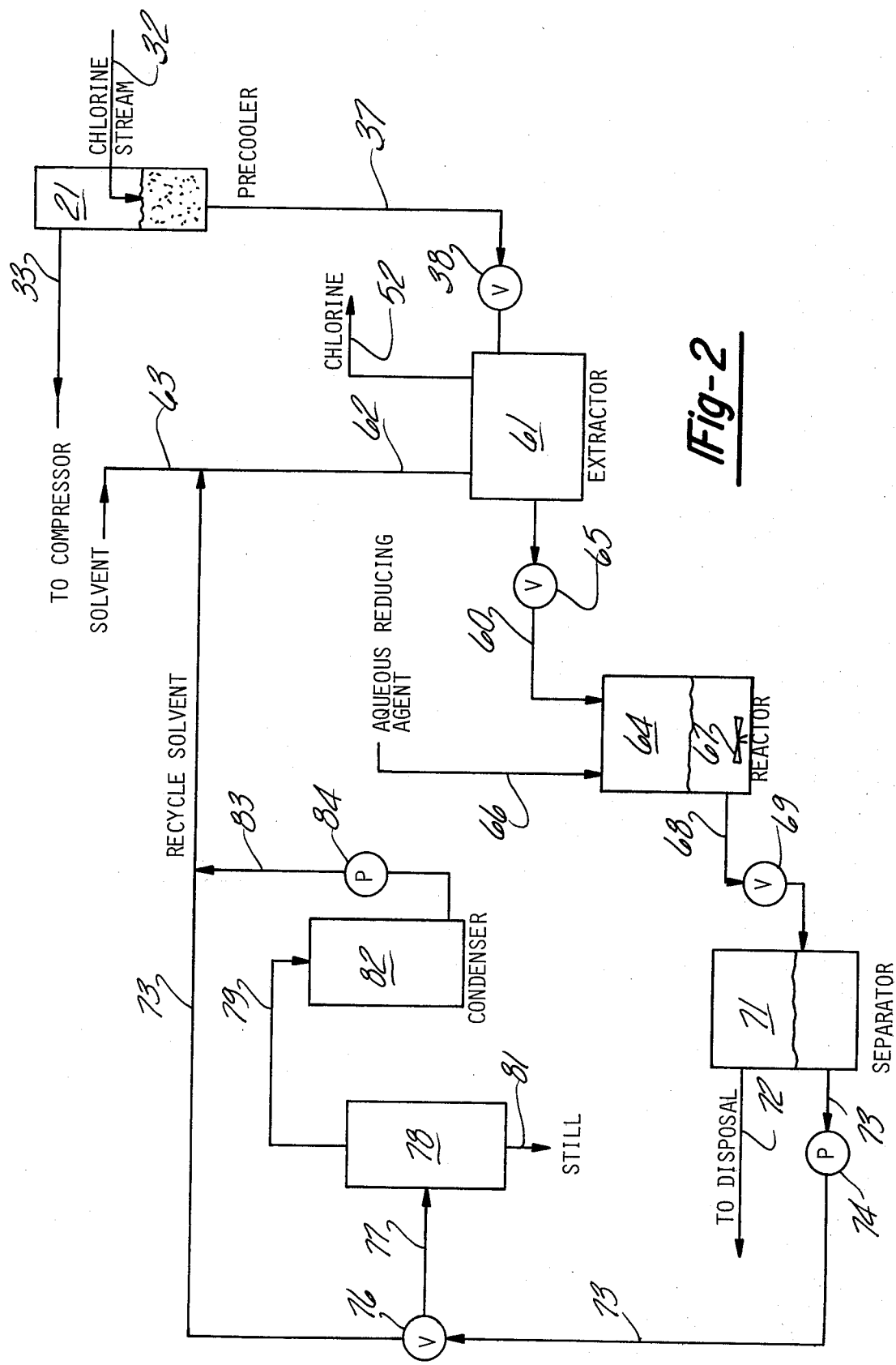
FIG. 2 is a flow diagram illustrating another embodiment of the invention.

Referring now to FIG. 2, an alternate embodiment of the invention is shown. In this embodiment a wet disposal system is used, whereas in FIG. 1, the solvent and all materials added are kept dry.

In the embodiment of FIG. 2, the same condensate in precooler 21 is to be treated to destroy the nitrogen trichloride build-up therein. Thus the chlorine stream 32, is separated and the substantially pure gas phase is removed through line 33. The liquid chlorine phase in the bottoms of precooler 21 is removed when the nitrogen trichloride therein has built up to a concentration of say 0.5% to 2.0% by weight to provide a solution of such nitrogen trichloride in liquid chlorine. This solution is removed through line 37 by operation of valve 38, and flows by gravity to extractor 61.

Although it will be appreciated that the process described herein could be a continuous operation, it is preferred that the condensate be removed and treated in batches. This is the most practical system, because it takes several days to a week for the build-up of nitrogen trichloride in the condensate to reach the values recommended for treatment.

As shown in FIG. 2, the extractor 61 is in the form of a tank which received the condensate and provide for the evaporation of chlorine therefrom by ambient temperatures or external heating (not shown). However, before any appreciable amount of chlorine is evaporated, organic solvent is added through line 62. The organic solvent is preferably carbon tetrachloride or chloroform, but it may be any inert organic solvent as described above in connection with the embodiment of FIG. 1. Make-up or original solvent is provided through line 63, but the bulk of the solvent is from recycled solvent as explained more fully hereinafter.

After substantially all of the chlorine has been removed from the extractor and taken out through line 52, the solution of nitrogen trichloride in organic solvent is removed through line 60 by operation of valve 65, and flows by gravity to reactor 64. The various concentrations of nitrogen trichloride in the chlorine solution and in the organic solvent solution are similar to those described for the embodiment of FIG. 1.

In addition to the solution of organic solvent, an aqueous solution of a reducing agent for the nitrogen trichloride is added to the reactor 64 through line 66. In general, any of many aqueous reducing agents may be used, because nitrogen trichloride is a very strong oxidizing agent and easily destroyed. However, the reducing agent must be water soluble to provide for addition thereof in aqueous solution, and the oxidation product of the reducing agent should also be water soluble so as to remain in the water phase. In addition, it is desirable to use reducing agents that oxidize to products that are compatible with the environment after disposal of same.

Typical examples of suitable reducing agents are sodium or potassium sulfite, sodium or potassium thiosulfate, sodium or potassium bisulfite, or the mono-, di-, or tri sodium or potassium salts of phosphorous acid. The preferred aqueous reducing agent is sodium sulfite and the reaction mechanism for same is as follows:

$$3Na_2SO_3 + NCl_3 + 3H_2O \rightarrow 3Na_2SO_4 + 2HCl + NH_4Cl$$

The sodium sulfate, ammonium chloride and hydrochloric acid thus formed remain in the aqueous phase along with the excess of sodium sulfite used. It will be appreciated that any chlorine remaining in the solution will also react with the sodium sulfite by the following reaction mechanism:

$$Na_2SO_3 + H_2O + Cl_2 \rightarrow Na_2SO_4 + 2HCl$$

Because of this reaction, it is desirable to remove substantially all of the chlorine from the organic solvent in extractor 61, and to use an excess of sodium sulfite over and above that required for removal of nitrogen trichloride.

In general, the amount of nitrogen trichloride in the solution will be less than about 2%. Therefore, an excess of sodium sulfite of say 20% to 100% more than the stoichiometric equivalent is recommended. With these amounts, rather dilute aqueous solutions are also recommended. Such dilute solutions have a high heat capacity and prevent temperature excursions during the heat liberated by the exothermic reactions.

The reactor 64 is equipped with a suitable agitator 67 to provide good interphase contact between the aqueous and organic phases, and the reactor is operated for a time sufficient to provide a substantially complete reaction.

After the reaction, the mixture is moved through line 68 by operation of valve 69 into separator 71. The aqueous phase is drawn from the separator through line 72, and thence moved to disposal. The organic phase is drawn from the separator 71 through line 73, and pumped by pump 74 through valve 76 and back to the extractor 61. This recycle solvent will contain a certain amount of water, and it is preferred to dry the solvent before it is returned to the extractor to reduce corrosion therein.

After a number of recycling operations, the solvent should be reconditioned. This is accomplished by moving the valve 76 from its normal position to communication with line 77. In this way, the solvent, which is now free of nitrogen trichloride, is moved to still 78, from which separated vapor is discharged through line 79, and the bottoms are removed at 81. The vapors in line 79 are condensed in condenser 82 and the condensate pumped back to the extractor through line 83 and the recycle line by the pump 84. In this way, accumulations of dissolved nonvolatile impurities such as hexachlorobenzene, hexachloropropane and various tars are removed.

It will be appreciated that the units utilized herein are conventional in the art, and that no further description thereof is necessary. It will also be appreciated that different pumping and valving arrangements could be utilized, and extra units such as holding tanks may be included.

From the above description, it is seen that we have provided a safe, inexpensive way to destroy and properly dispose of potentially hazardous nitrogen trichloride. It is also seen that our system utilizes chlorinated organic solvents to handle the nitrogen trichloride in order to insure positive safety, while at the same time, the chlorinated organic solvent is almost completely kept out of the disposal system. In this way, the recognized advantages of using the chlorinated organic solvents in retaining the nitrogen trichloride in safe condition until destroyed are utilized, while simultaneously overcoming the disposal problems heretofore encountered. In addition, a cost saving in solvent is provided.

The embodiments of the invention in which an exclusive property or privilege is claimed are defined as follows:

1. An apparatus for removing and destroying nitrogen trichloride contaminant present in chlorine produced electrolytically from brine comprising
   an extraction device for receiving chlorine containing accumulations of nitrogen trichloride,
   means for moving said contaminated chlorine and nitrogen trichloride to said extraction device,
   means for adding an inert organic solvent to said extraction device in an amount sufficient to provide a safely diluted solution of nitrogen trichloride therein,
   means for heating the extraction device to remove substantially all of the chlorine therefrom,
   reactor means,
   means for discharging chlorine from said extraction device,
   means for moving the diluted solution of nitrogen trichloride from the extraction device to the reactor means,
   means for adding a reaction component said reactor to react with nitrogen trichloride and to convert it to ammonium chloride,
   means for discharging chlorine formed in said reactor,
   means for removing the reaction mixture from said reactor, means for separating the solvent from the reaction mixture, removed from the reactor, after the conversion of the nitrogen trichloride, and
   means for recycling the separated solvent from said reactor to the extraction device.

2. An apparatus as defined in claim 1, in which the means for adding the reaction component provides for addition of hydrogen chloride at the bottom of the reactor to provide agitation therein.

3. An apparatus as defined in claim 2, in which the means for separating the solvent comprises a filter.

4. An apparatus as defined in claim 3, in which the means for recycling the separated solvent includes a by-pass line having a distiller and condenser therein.

5. An apparatus as defined in claim 1, in which the reactor is equipped with a stirrer, and in which the reaction component capable of reducing the nitrogen trichloride is an aqueous solution of an inorganic reducing agent.

6. An apparatus as defined in claim 5, in which the aqueous reducing agent is a solution of sodium sulfite.

7. An apparatus as defined in claim 1, in which the reactor is equipped with an agitator.

8. An apparatus as defined in claim 1, in which the means for separating the solvent comprises a liquid separator having means for withdrawing each of two phases separately.

9. An apparatus as defined in claim 1, in which the means for recycling the separated solvent includes a by-pass line having a still and a condenser therein.

* * * * *